(12) United States Patent
Lochocki et al.

(10) Patent No.: US 10,316,968 B2
(45) Date of Patent: Jun. 11, 2019

(54) METHOD AND APPARATUS FOR RATIO CONTROL FOR A CONTINUOUSLY VARIABLE TRANSMISSION

(71) Applicant: GM Global Technology Operations LLC, Detroit, MI (US)

(72) Inventors: Ronald F. Lochocki, Ypsilanti, MI (US); Christopher J. Weingartz, Fenton, MI (US); Greg J. Perantoni, Fenton, MI (US); Stuart W. Parker, Ann Arbor, MI (US); Paul G. Otanez, Franklin, MI (US); Bret M. Olson, Whitelake, MI (US); Mary M. Whitley, Brighton, MI (US); Nathan A. Schmidt, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 213 days.

(21) Appl. No.: 15/596,219

(22) Filed: May 16, 2017

(65) Prior Publication Data

US 2018/0335138 A1    Nov. 22, 2018

(51) Int. Cl.

| F16H 61/662 | (2006.01) |
|---|---|
| F16H 61/00 | (2006.01) |
| F16H 61/18 | (2006.01) |
| F16H 9/18 | (2006.01) |
| B60W 10/107 | (2012.01) |

(52) U.S. Cl.
CPC ......... *F16H 61/66272* (2013.01); *F16H 9/18* (2013.01); *F16H 2061/66277* (2013.01)

(58) Field of Classification Search
CPC ........... F16H 61/66272; F16H 61/0021; F16H 61/18; F16H 9/18; F16H 2061/66277; B60W 10/107
See application file for complete search history.

(56) References Cited

U.S. PATENT DOCUMENTS

| 6,443,871 B2 * | 9/2002 | Taniguchi | ......... F16H 61/66272 474/70 |
|---|---|---|---|
| 7,261,672 B2 * | 8/2007 | Frank | ...................... B60K 6/36 477/45 |
| 7,666,110 B2 * | 2/2010 | Iwatsuki | ............ F16H 61/66272 474/28 |

(Continued)

*Primary Examiner* — Jacob S. Scott
*Assistant Examiner* — Tinh T. Dang

(57) ABSTRACT

An apparatus for ratio control of a continuously variable transmission includes a driver commanded ratio unit outputting a signal defining a commanded ratio. A clamp control portion is in communication with the driver commanded ratio unit. The clamp control portion includes: a ratio limits and override ring selecting a ratio matching the commanded ratio from an executable functions having stored ratio code data; a screening monitor continuously receiving output from the executable functions and using an input from a vehicle speed signal to compute minimum and maximum ratio limits for the ratio selected by the ratio limits and override ring; and a ratio control execution ring in communication with the screening monitor. The ratio control execution ring calculates a range of pressures allowed for operation of both primary and secondary pulleys of the continuously variable transmission.

20 Claims, 3 Drawing Sheets

(56) References Cited

U.S. PATENT DOCUMENTS

| | | | | |
|---|---|---|---|---|
| 8,070,650 | B2* | 12/2011 | Ogata | F16H 61/12 |
| | | | | 475/210 |
| 8,226,507 | B2* | 7/2012 | Uchiyama | F16H 61/12 |
| | | | | 474/49 |
| 8,412,636 | B2* | 4/2013 | Katou | F16H 61/66272 |
| | | | | 474/18 |
| 8,914,206 | B2* | 12/2014 | Hattori | F16H 9/125 |
| | | | | 701/51 |
| 8,924,104 | B2* | 12/2014 | Natori | F16H 61/66272 |
| | | | | 701/51 |
| 9,394,992 | B2* | 7/2016 | Fujimura | F16H 61/12 |
| 9,689,491 | B2* | 6/2017 | Ito | F16H 9/18 |
| 2006/0105868 | A1* | 5/2006 | Moorman | F16H 61/66259 |
| | | | | 474/28 |
| 2006/0172829 | A1* | 8/2006 | Ishio | F16H 61/0021 |
| | | | | 474/18 |
| 2008/0004141 | A1* | 1/2008 | Toyoda | F16H 61/0021 |
| | | | | 474/28 |
| 2013/0080008 | A1* | 3/2013 | Tanaka | F16H 61/12 |
| | | | | 701/62 |
| 2017/0227120 | A1* | 8/2017 | Zhang | F16H 61/662 |

* cited by examiner

METHOD AND APPARATUS FOR RATIO CONTROL FOR A CONTINUOUSLY VARIABLE TRANSMISSION

INTRODUCTION

The present disclosure relates to continuously variable transmissions (CVTs) and ratio control systems for a continuously variable transmission.

Continuously variable transmissions (CVTs) change hydraulic pressure on an input pulley set and an output pulley set connected by a belt or chain to change an effective diameter of the pulley sets thereby allowing a continuous variation of a transmission ratio. Ratio control systems are provided using computer control systems including engine control modules (ECM's) and transmission control modules (TCM's) to monitor and change the hydraulic pressure to provide driver commanded torque changes, to incorporate engine data, and to incorporate environmental inputs.

An unintended deceleration (UD) or an unintended acceleration (UA) may be possible if the ratio control system's computer controls receive hazardous (corrupt) inputs from the ECM's algorithm, software, or calibrations, or if the TCM's algorithm, software, or calibrations are themselves corrupted. Corrupted inputs are possible due to environmental conditions such as ultraviolet light, electromagnetic pulses in areas where the vehicle is operating, temperature variations, corrupted calibration data, AEPP (accelerator effective pedal position) input error, ratio selection error, ratio command computation error, possibly resulting in a UD or UA hazard metric violation.

Current CVTs may default to a safe mode wherein power from the prime mover is significantly reduced or a severely limited transmission output if corrupted inputs are received which would cause a UD or UA event or an unintended acceleration. It is undesirable in many situations to default to the shutdown condition if the condition can be attributed primarily to corrupted data.

Thus, while current CVT ratio control systems achieve their intended purpose, there is a need for a new and improved system and method for monitoring and controlling CVT ratio.

SUMMARY

According to several aspects, an apparatus for ratio control of a continuously variable transmission includes a driver commanded ratio unit. The driver commanded ratio unit outputs a signal defining a commanded ratio. A ratio selection and ratio control clamp control portion is in communication with the driver commanded ratio unit. The ratio selection and ratio control clamp control portion includes a ratio limits and override ring selecting a ratio matching the commanded ratio from a ratio limits and override ring executable functions having stored ratio code data. A ratio limits and override ring screening monitor continuously receives output from the ratio limits and override ring executable functions and uses an input from a vehicle speed signal to compute minimum and maximum ratio limits for the ratio selected by the ratio limits and override ring. A ratio control execution ring is in communication with the ratio limits and override ring screening monitor. The ratio control execution ring calculates a range of pressures allowed for operation of both primary and secondary pulleys of the continuously variable transmission.

In another aspect of the present disclosure, the ratio control execution ring includes a ratio control execution ring executable functions having a range of pressures to achieve the commanded ratio from stored data related to multiple different commanded ratios.

In another aspect of the present disclosure, the ratio control execution ring includes a ratio control execution ring screening monitor continuously receiving pressure signal data from the ratio control execution ring executable functions and measuring commanded primary and secondary pulley pressures.

In another aspect of the present disclosure, a vehicle acceleration signal derived from speed sensor information is included, the ratio control execution ring screening monitor applying vehicle acceleration data received from the vehicle speed sensor to identify if commanded pressure delta is leading or lagging a sudden change in vehicle deceleration.

In another aspect of the present disclosure, a transmission solenoid control ring is included. The ratio control execution ring screening monitor forwards a clamping signal to the transmission solenoid control ring to establish commanded pressures to the primary pulley and the secondary pulley.

In another aspect of the present disclosure, the ratio selection and ratio control clamp control portion further includes a variator desired ratio ring directly receiving the commanded ratio from the driver commanded ratio unit and communicating the commanded ratio to the ratio limits and override ring.

In another aspect of the present disclosure, an engine controller is in communication with the desired ratio ring, wherein the desired ratio ring selects which of the commanded ratio or an engine commanded ratio from the engine controller to forward to the ratio limits and override ring.

In another aspect of the present disclosure, the ratio selection and ratio control clamp control portion further includes: a CVT commanded ratio trajectory ring, the commanded ratio trajectory ring generating a commanded CVT ratio meeting the minimum and maximum ratio limits; and a clamping pressure determination ring identifying a minimum pressure or force required for operation of either the primary or the secondary pulley, the minimum pressure communicated to the ratio control execution ring.

In another aspect of the present disclosure, the data saved in the ratio limits and override ring executable functions includes predetermined ratio ranges individually applicable to operational conditions including uphill, downhill, braking, and panic stop.

In another aspect of the present disclosure, the ratio limits and override ring executable functions selects a ratio achieving conditions of the commanded ratio given vehicle operating conditions.

According to several aspects, an apparatus for ratio control of a continuously variable transmission includes a driver commanded ratio unit outputting a signal defining a commanded ratio. A ratio selection and ratio control clamp control portion is in communication with the driver commanded ratio unit. The ratio selection and ratio control clamp control portion includes a ratio limits and override ring selecting a ratio matching the commanded ratio from an ratio limits and override ring executable functions having stored ratio code data. A ratio control execution ring is in communication with the ratio limits and override ring, the ratio control execution ring calculating a range of pressures allowed for operation of both a primary pulley and a secondary pulley of the continuously variable transmission. The ratio control execution ring includes: a ratio control execution ring executable functions having stored data related to multiple different commanded ratios; and a ratio control execution ring screening monitor continuously receiving pressure signal data from the ratio control execution ring executable functions and measuring commanded primary and secondary pulley pressures. The ratio control execution ring screening monitor applies vehicle acceleration data to identify if commanded pressure is leading or lagging a sudden change in vehicle acceleration. The ratio control execution ring monitor also takes into account vehicle speed and current vehicle operating condition.

In another aspect of the present disclosure, a ratio limits and override ring screening monitor continuously receives output from the ratio limits and override ring executable functions.

In another aspect of the present disclosure, a vehicle speed signal is included, the ratio limits and override ring screening monitor using the vehicle speed signal to compute minimum and maximum ratio limits for the ratio selected by the ratio limits and override ring.

In another aspect of the present disclosure, the ratio selection and ratio control clamp control portion further includes a CVT commanded ratio, the commanded ratio trajectory ring generating a CVT commanded ratio meeting the minimum and maximum ratio limits.

In another aspect of the present disclosure, the ratio selection and ratio control clamp control portion further includes a clamping pressure determination ring identifying a minimum pressure or force required for operation of either the primary pulley or the secondary pulley.

In another aspect of the present disclosure, each of the CVT commanded ratio and the minimum pressure is independently communicated to the ratio control execution ring.

In another aspect of the present disclosure, a transmission solenoid control ring is included. The ratio control execution ring screening monitor forwards a clamping signal to the transmission solenoid control ring to establish commanded pressures to the primary pulley and the secondary pulley. A clutch control module is in communication with the transmission solenoid control ring.

According to several aspects, an apparatus for ratio control of a continuously variable transmission includes a driver commanded ratio unit outputting a signal defining a commanded ratio. A ratio selection and ratio control clamp control portion is in communication with the driver commanded ratio unit. The ratio selection and ratio control clamp control portion includes: a ratio limits and override ring selecting a ratio matching the commanded ratio from an ratio limits and override ring executable functions having stored ratio code data; a ratio limits and override ring screening monitor continuously receiving output from the ratio limits and override ring executable functions and using an input from a vehicle speed signal to compute minimum and maximum ratio limits for the ratio selected by the ratio limits and override ring; a ratio control execution ring in communication with the ratio limits and override ring screening monitor, the ratio control execution ring calculating a range of pressures allowed for operation of both primary and secondary pulleys of the continuously variable transmission. The ratio control execution ring includes: a ratio control execution ring executable functions having a range of pressures to achieve the commanded ratio from stored data related to multiple different commanded ratios; and a ratio control execution ring screening monitor continuously receiving pressure signal data from the ratio control execution ring executable functions and measuring commanded primary and secondary pulley pressures, the ratio control execution ring screening monitor applying vehicle acceleration data received to identify if commanded pressure is leading or lagging a sudden change in vehicle deceleration.

In another aspect of the present disclosure, a clutch control monitoring ring is provided external to the ratio selection and ratio control clamp control portion. The clutch control monitoring ring continuously monitors an accelerator pedal, a brake pedal, and pressures of the primary pulley and the secondary pulley pressures.

In another aspect of the present disclosure, the clutch control monitoring ring is in communication with an acceleration-deceleration module containing multiple acceleration-deceleration data rings, the clutch control monitoring ring generating an open-input-clutch signal to open a vehicle input clutch.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
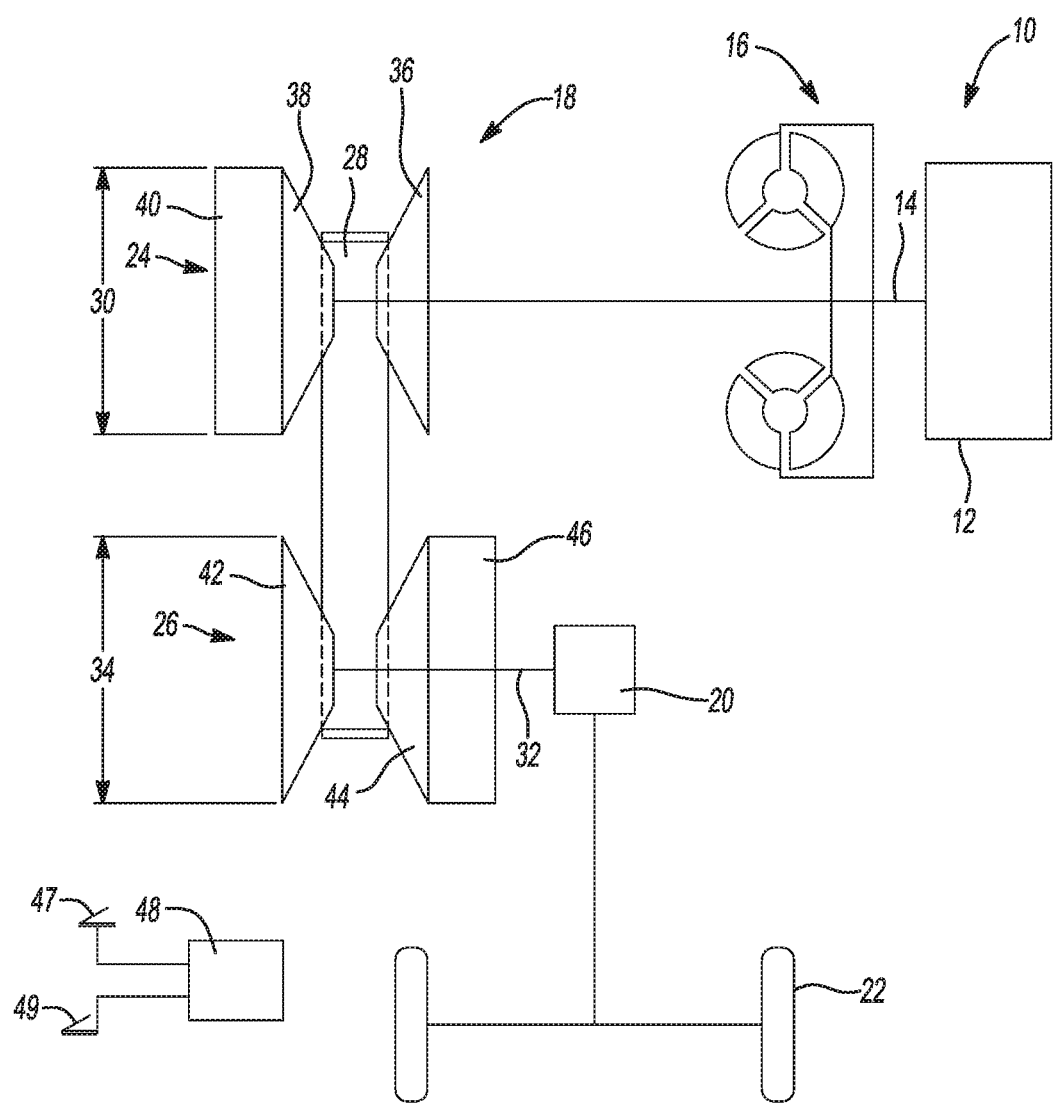
FIG. 1 is a functional block diagram of a vehicle power transmitting system according to an exemplary embodiment.

Referring to FIG. 1, a vehicle power transmitting system 10 according to one aspect of the present disclosure includes a power source 12 such as an internal combustion engine or electrical motor. Output from the power source 12 is transmitted via an input shaft 14 from the power source 12 and via a torque converter 16, providing a fluid coupling, to a chain or belt-driven continuously variable transmission 18, and a reduction gear device 20, after which it is distributed to at least one driven wheel 22.

The continuously variable transmission 18 includes a primary or an input side variable pulley 24, a secondary or an output side variable pulley 26, and a transmission chain or belt, hereinafter belt 28. The input side variable pulley 24 provided on the input shaft 14 defines an input side member with a variable effective diameter 30. The output side variable pulley 26, provided on an output shaft 32, is an output side member that has a variable diameter 34. The belt 28 serves as a power transmission member that is positioned around and in frictional contact with the variable pulleys 24 and 26 such that power is transmitted via frictional force between the belt 28 and the variable pulleys 24 and 26.

The input side variable pulley 24 includes a conical faced fixed sheave 36, a conical faced movable sheave 38, and an input hydraulic chamber 40. Similarly, the output side variable pulley 26 includes a conical faced fixed sheave 42, a conical faced movable sheave 44, and an output hydraulic chamber 46. The fixed sheave 36 is fixed to the input shaft 14 and the fixed sheave 42 is fixed to the output shaft 32. The movable sheave 38 is axially slidable on the input shaft 14 to move in an axial direction of the input shaft 14, while being prevented from rotating around the axis of the input shaft 14. Similarly, the movable sheave 44 is axially slidable on the output shaft 32 to move in an axial direction of the output shaft 32, while being prevented from rotating around the axis of the output shaft 32.

The input hydraulic chamber 40 receives pressurized hydraulic fluid and generates axial thrust by displacing the movable sheave 38 to vary a V-shaped groove width formed between the fixed sheave 36 and the movable sheave 38. Similarly, the output hydraulic chamber 46 receives pressurized hydraulic fluid and generates an oppositely directed axial thrust with respect to the movable sheave 38 by displacing the movable sheave 44 to vary a V-shaped groove width formed between the fixed sheave 42 and the movable sheave 44. An input shaft 14 to output shaft 32 speed ratio can be continuously changed by changing the V-shaped groove widths defined by of each of the movable sheaves 38 and 44. Changing the V-shaped groove widths varies a winding diameter or effective diameter of the belt 28 around the pulleys, which is done by controlling one or both of the hydraulic pressure in the input hydraulic chamber 40 of the primary or input side variable pulley 24 and the hydraulic pressure in the output hydraulic chamber 46 of the secondary or output side variable pulley 26. Sensor input data and actuator output data, and commands for controlling the continuously variable transmission 18 such as from a driver controlled accelerator pedal 47 are provided to and by a transmission control module (TCM) 48. The TCM 48 communicates with the accelerator pedal 47, a brake pedal 49, and the primary and secondary input side variable pulleys 24, 26.

Referring to FIG. 2 and again to FIG. 1, a backbone of the control system defining the TCM 48 is presented. The TCM 48 includes a driver commanded ratio unit 50 having multiple data rings. The driver commanded ratio unit 50 outputs a signal defining a desired or commanded driver torque or ratio, generated for example by driver displacement of an accelerator pedal, which is communicated to a CVT desired ratio ring 52. The desired ratio ring 52 is included in a ratio selection and ratio control clamp control portion 54 of the TCM 48. The driver commanded ratio unit 50 also communicates with code rings of an executive shift determination section 56 including for example a shift point ring 58 which provide shift decisions to a CVT mode shift control and garage shift control section 60 which is provided in a clutch control module 62. The clutch control module 62 controls operation of clutches for example to achieve forward or reverse operation, garage shift, torque converter lockup, and the like, and also receives data from a clutch control adapt ring 64. The CVT mode shift control and garage shift control section 60 outputs data to a clutch control output arbitration ring 66. Output from the clutch control output arbitration ring 66 is forwarded to a solenoid command arbitration ring 68. The solenoid command arbitration ring 68 also receives input from a solenoid override ring 70 which filters solenoid command signals.

The TCM 48 also includes a transmission commanded pressure 72 which receives pressure signals from at least one hydraulic pressure sensor 74. Output commands from the solenoid command arbitration ring 68 of the clutch control module 62 are forwarded to a transmission solenoid control ring 76 which generates electrical control signals to provide electrical current for operation of the various solenoids which distribute hydraulic pressure to the input hydraulic chamber 40 and the output hydraulic chamber 46. According to several aspects, in addition to or in lieu of utilizing the driver intended torque from the driver commanded ratio unit 50, the desired ratio ring 52 can also receive command input directly from an engine control module 78. Ratio input from the engine control module 78 may be used for example to help improve fuel economy when engine operating conditions can be used to override the driver commanded ratio.

The desired ratio ring 52 communicates with a ratio limits and override ring 80 which includes a ratio limits and override ring executable functions 82 having stored ratio code data. Data saved in the ratio limits and override ring executable functions 82 can include for example predetermined ratios or ratio ranges applicable to different operational conditions such as uphill, downhill, braking, panic stop, and the like. The ratio limits and override ring executable functions 82 receives the requested ratio from the desired ratio ring 52 and selects the most appropriate ratio to achieve the conditions of the requested ratio given vehicle operating conditions. To ensure that the ratio selected by the ratio limits and override ring executable functions 82 is not based on corrupted data or is outside of an allowable range of conditions for the ratio, a ratio limits and override ring screening monitor 84 continuously receives the ratio data output from the ratio limits and override ring executable functions 82 and using an input from a vehicle speed signal 85 computes minimum and maximum ratio limits 86 based on a vehicle speed for the commanded or ratio selected by the ratio limits and override ring executable functions 82.

The computed minimum and maximum ratio limits 86 are applied to keep a screened ratio 87 output from the ratio limits and override ring screening monitor 84 within a safe range defined as a range which avoids an unintended deceleration or an unintended acceleration. This ensures any upstream data corruption, for example due either to a computation or from a controller area network (CAN) transmission, or the like, does not manifest itself as an engine over-speed condition due for example to a broad ratio step command. The screened ratio 87 output from the ratio limits and override ring screening monitor 84 modified as necessary by the computed minimum and maximum ratio limits 86 is forwarded to a CVT commanded ratio trajectory ring 88. The ratio limits and override ring screening monitor 84 sends the screened ratio 87 modified by the minimum and maximum ratio limits 86 as commands to the commanded ratio trajectory ring 88 to protect against a bad ratio command from being commanded by the commanded ratio trajectory ring 88. If either the minimum or maximum limits 86 are met, the monitor will not let the ratio exceed the limit, and a flag is set indicating the monitor has limited the ratio in the ratio limits and override ring 80 and the commanded ratio trajectory ring 88.

Using the screened ratio 87, the commanded ratio trajectory ring 88 generates a commanded CVT ratio 89 meeting the minimum and maximum ratio limits 86 which is communicated to a clamping force ring 90. Given the commanded CVT ratio 89, the clamping force ring 90 identifies a lowest or minimum pressure or force required for operation of either of the primary or the secondary pulleys. This minimum pressure signal is communicated to a ratio control execution ring 92. The commanded CVT ratio 89 is also directly communicated to the ratio control execution ring 92. Given the minimum pressure necessary for any one of the primary or the secondary pulleys the ratio control execution ring 92 then calculates a range of pressures allowed for operation of both the primary and the secondary input side variable pulleys 24, 26.

The ratio control execution ring 92 includes a ratio control execution ring executable functions 94 identifies an acceptable range of pressures to achieve each commanded ratio from stored data related to multiple different commanded ratios. The ratio control execution ring executable functions 94 communicates with a ratio control execution ring screening monitor 98. Similar to the ratio limits and override ring screening monitor 84, to ensure that the pressure range selected by the ratio control execution ring executable functions 94 is not based on corrupted data or is outside of an allowable pressure range for the commanded ratio, the ratio control execution ring screening monitor 98 continuously receives pressure signal data from the ratio control execution ring executable functions 94 and using vehicle speed data received from an output speed sensor TOSR 100 plus vehicle acceleration data, the ratio control execution ring screening monitor 98 measures the commanded primary and secondary pulley pressures and takes into account if commanded pressure is leading or lagging a sudden change in vehicle deceleration. The ratio control execution ring screening monitor 98 also takes into account vehicle speed and vehicle operating conditions. The ratio control execution ring screening monitor 98 forwards a clamping signal 102 to the transmission solenoid control ring 76 to establish commanded primary and secondary pulley pressures.

The ratio control execution ring screening monitor 98 can also modify the clamping signal 102 to clamp commanded primary and secondary pulley pressures as necessary to prevent a hazard. If an unexpected command is generated from the pressures that could lead to an unintended deceleration or unintended acceleration, a hazard condition is present. If a hazard condition is present the ratio control execution ring screening monitor 98 limits the clamping signal 102 defining the commanded primary and secondary pulley pressures to a safe level which will not lead to an unintended deceleration or an unintended acceleration.

The ratio limits and override ring 80 and the ratio control execution ring 92 of the ratio selection and ratio control clamp control portion 54 are relied on to set a ratio, and to control clamping pressures to prevent unintended deceleration (UD) or unintended acceleration without requiring default to a safe mode even if the ratio control system's computer controls receive hazardous (corrupt) inputs from the ECM's algorithm, software, or calibrations, or if the TCM 48 algorithm, software, or calibrations are themselves corrupted.

A clutch control monitoring ring 104 is provided outside of the ratio selection and ratio control clamp control portion 54. Via an input 106, the clutch control monitoring ring 104 continuously monitors the accelerator pedal, the brake pedal, and primary and secondary pulley pressures. An acceleration-deceleration module 108 containing multiple acceleration-deceleration data rings receives input from throughout the vehicle. The acceleration-deceleration module 108 generates an acceleration-deceleration signal 110 forwarded to the clutch control monitoring ring 104. If a predetermined vehicle acceleration per unit time or a predetermined vehicle deceleration per unit time outside of the limitations monitored by the ratio selection and ratio control clamp control portion 54 occurs which indicates an unintended acceleration or deceleration is present, thereby indicating a hazard is present, default to a safe mode may be interdicted. According to several aspects an unintended acceleration may be an acceleration exceeding 0.2 g in a period of 0.2 sec, and an unintended deceleration may be a deceleration exceeding 0.5 g in a time period of 0.5 sec. These values are exemplary and can vary within the scope of the present disclosure.

Accelerator pedal and brake pedal sensors assist in identifying when accelerator pedal or brake pedal actuation indicate a vehicle acceleration or deceleration are intended. A primary or secondary pulley pressure increase occurring together with a rapid vehicle deceleration without operation of the brake pedal may for example indicate an unintended deceleration.

In one example the clutch control monitoring ring 104 computes a hazard by evaluating a rate of change of transmission output speed occurring together with a large pulley pressure change before or after a large vehicle acceleration or deceleration. If a large acceleration or deceleration is present after a large change in pulley pressure, and with an accelerator or brake pedal input that does not exceed a calibratable input threshold, the clutch control monitoring ring 104 enables and evaluates if a deceleration hazard has occurred. A pressure diagnostic will also run when the clutch control monitoring ring 104 is tripped which diagnoses the reason or reasons for the hazard. When a hazard has occurred, an open-input-clutch signal 112 is generated which opens the vehicle input clutch, disconnecting power flow from the engine.

Figure 2:
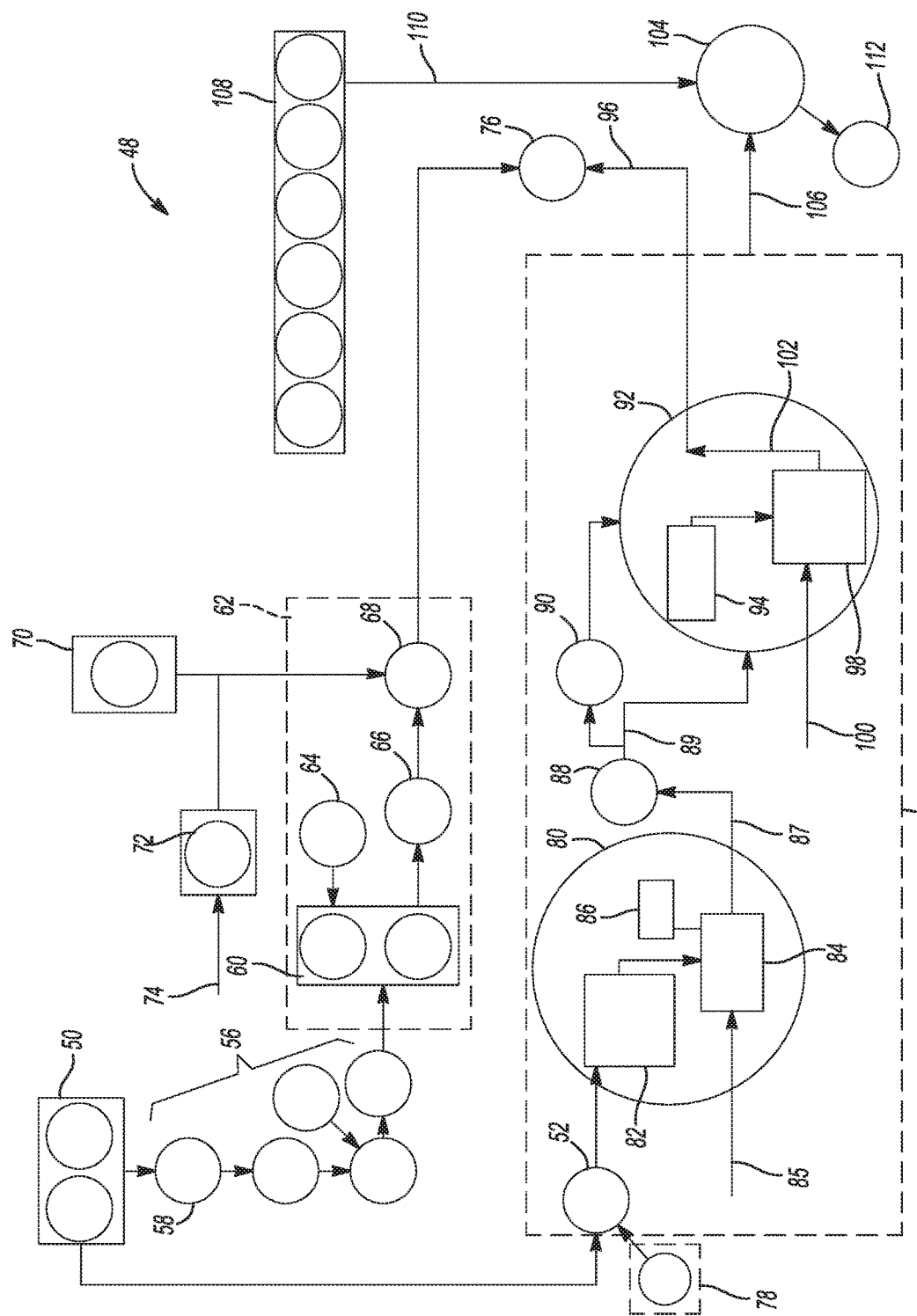
FIG. 2 is a functional block diagram of a transmission control monitor for the vehicle power transmitting system of FIG. 1.

Referring to FIG. 3 and again to FIGS. 1 and 2, a graph 114 presents exemplary data of ratio monitoring functions 116 over time 118. A first curve 120 depicts a ratio minimum limit and a second curve 122 depicts a ratio maximum limit. A commanded ratio 124 curve presents a region 126 where the commanded ratio exceeds the second curve 122 ratio maximum limit when a vehicle speed depicted by a vehicle speed curve 128 indicates the vehicle is accelerating. A ratio clip Boolean 130 is applied in the region 126 to clip or limit the commanded ratio 124 to the maximum allowed ratio indicated by the second curve 122 ratio maximum limit.

As previously noted, to ensure that the ratio selected by the ratio limits and override ring executable functions 82 is not based on corrupted data or is outside of an allowable range of conditions for the ratio, the ratio limits and override ring screening monitor 84 continuously receives the ratio data output from the ratio limits and override ring executable functions 82 and using the vehicle speed input from the vehicle speed signal 85 computes minimum and maximum ratio limits 86 for the ratio selected by the ratio limits and override ring executable functions 82. The computed minimum and maximum ratio limits 86 are applied as the ratio clip Boolean 130 to keep the screened ratio 87 output from the ratio limits and override ring screening monitor 84 within the safe range defined as a range which avoids an unintended deceleration or an unintended acceleration.

Figure 3:
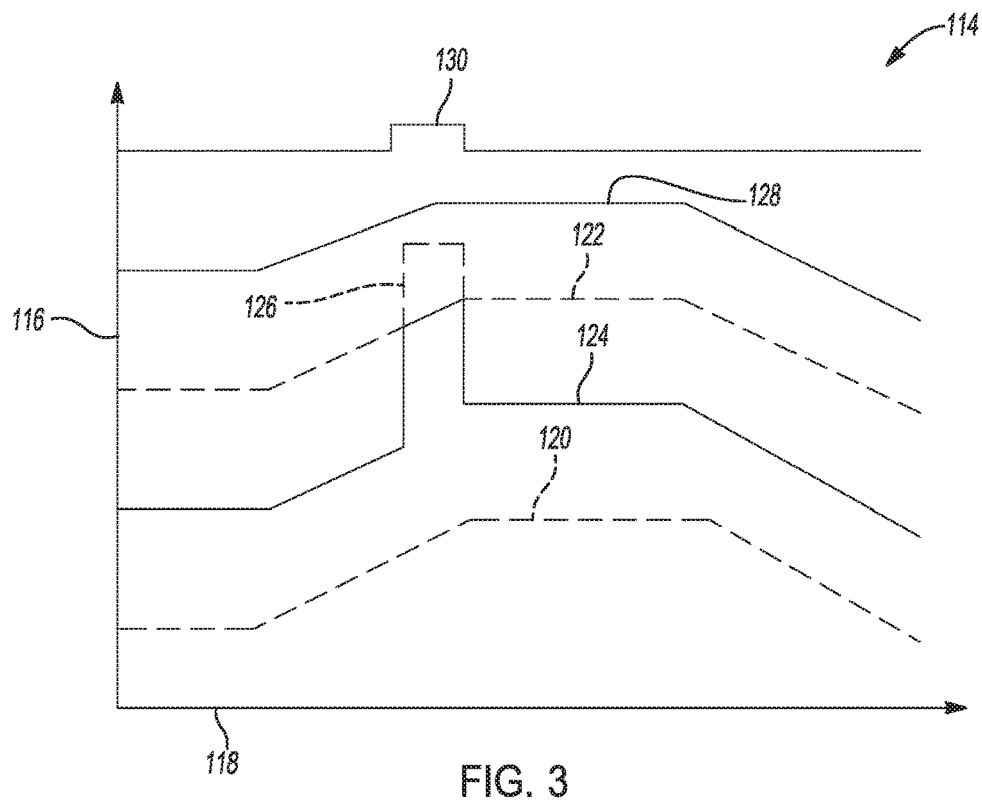
FIG. 3 is a graph of exemplary ratio monitoring capabilities of the transmission control monitor of FIG. 2.
Figure 4:
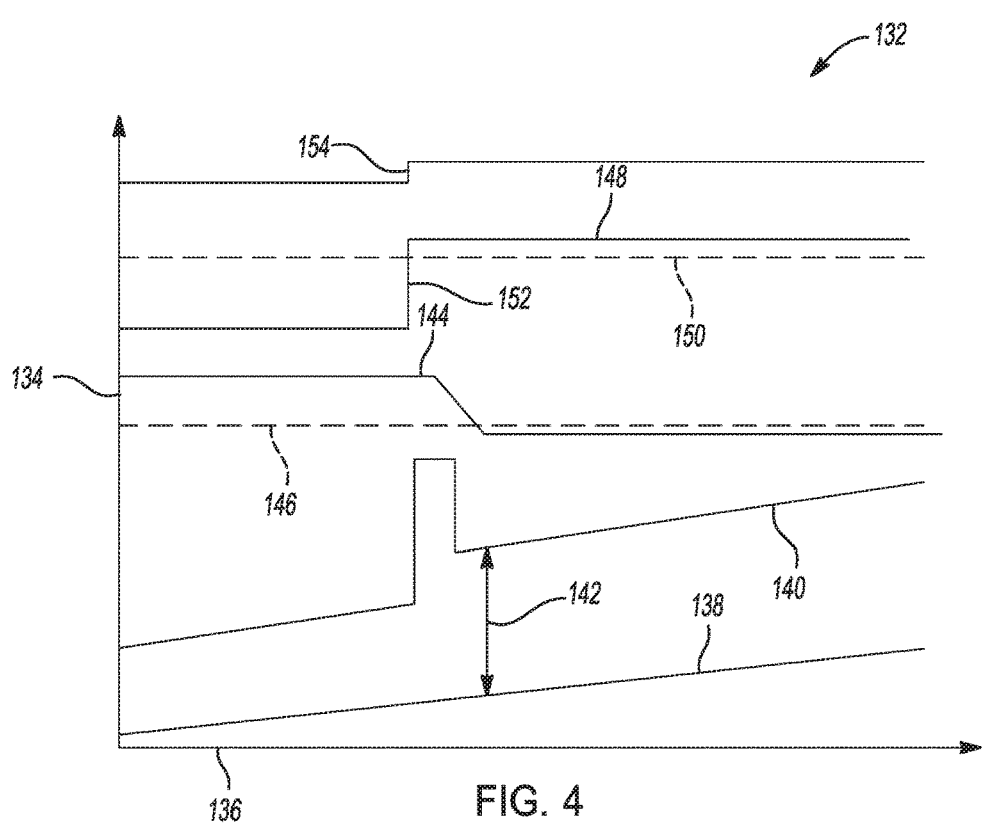
FIG. 4 is a graph of exemplary pressure monitoring capabilities of the transmission control monitor of FIG. 2.

Referring to FIG. 4 and again to FIGS. 1 through 3, a graph 132 presents exemplary data of pressure functions 134 over time 136. A first curve 138 depicts a pressure of the clamping pulley and a second curve 140 depicts a pressure of the ratio pulley. A difference or delta limit 142 for the ratio pressure is predetermined. A deceleration curve 144 is depicted dropping below a deceleration threshold 146 during a time period when an increasing pressure delta 148 exceeds a pressure delta threshold 150. At a time of a sharp change 152 occurs in the pressure delta 148, a ratio clip Boolean 154 is applied to clip the system pressure to avoid an unintended deceleration or an unintended acceleration.

A method and apparatus for ratio control of a continuously variable transmission of the present disclosure offers several advantages. These include providing protection for transmission controls ratio control system from hazardous engine control inputs, including accelerator effective pedal position inputs. Protection is also provided against corrupted transmission controls including ratio selection, ratio command computation, and UD/UA metric violations. A two level algorithm is provided having as a first level calibration and computation corruption protection, and as a second level a fault monitor.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An apparatus for ratio control of a continuously variable transmission, comprising:
    a driver commanded ratio unit, the driver commanded ratio unit outputting a signal defining a commanded ratio;
    a ratio selection and ratio control clamp control portion in communication with the driver commanded ratio unit, the ratio selection and ratio control clamp control portion including:
        a ratio limits and override ring selecting a ratio matching the commanded ratio from a ratio limits and override ring executable functions having stored ratio code data;
        a ratio limits and override ring screening monitor continuously receiving output from the ratio limits and override ring executable functions and using an input from a vehicle speed signal to compute minimum and maximum ratio limits for the ratio selected by the ratio limits and override ring; and
        a ratio control execution ring in communication with the ratio limits and override ring screening monitor, the ratio control execution ring calculating a range of pressures allowed for operation of both primary and secondary pulleys of the continuously variable transmission.

2. The apparatus for ratio control of a continuously variable transmission of claim 1, wherein the ratio control execution ring includes a ratio control execution ring executable functions having a range of pressures to achieve the commanded ratio from stored data related to multiple different commanded ratios.

3. The apparatus for ratio control of a continuously variable transmission of claim 2, wherein the ratio control execution ring includes a ratio control execution ring screening monitor continuously receiving pressure signal data from the ratio control execution ring executable functions and measuring commanded primary and secondary pulley pressures.

4. The apparatus for ratio control of a continuously variable transmission of claim 3, further including a vehicle acceleration signal derived from speed sensor information, the ratio control execution ring screening monitor applying the vehicle acceleration signal received from the vehicle speed sensor to identify if commanded pressure delta is leading or lagging a sudden change in vehicle deceleration.

5. The apparatus for ratio control of a continuously variable transmission of claim 3, further including a transmission solenoid control ring, the ratio control execution ring screening monitor forwarding a clamping signal to the transmission solenoid control ring to establish commanded pressures to the primary pulley and the secondary pulley.

6. The apparatus for ratio control of a continuously variable transmission of claim 1, wherein the ratio selection and ratio control clamp control portion further includes a variator desired ratio ring directly receiving the commanded ratio from the driver commanded ratio unit and communicating the commanded ratio to the ratio limits and override ring.

7. The apparatus for ratio control of a continuously variable transmission of claim 6, further including an engine controller in communication with the desired ratio ring, wherein the desired ratio ring selects which of the commanded ratio or an engine commanded ratio from the engine controller to forward to the ratio limits and override ring.

8. The apparatus for ratio control of a continuously variable transmission of claim 1, wherein the ratio selection and ratio control clamp control portion further includes:
    a CVT commanded ratio trajectory ring, the commanded ratio trajectory ring generating a commanded CVT ratio meeting the minimum and maximum ratio limits; and
    a clamping pressure determination ring identifying a minimum pressure or force required for operation of either the primary or the secondary pulley, the minimum pressure communicated to the ratio control execution ring.

9. The apparatus for ratio control of a continuously variable transmission of claim 1, wherein the data saved in the ratio limits and override ring executable functions includes predetermined ratio ranges individually applicable to operational conditions including uphill, downhill, braking, and panic stop.

10. The apparatus for ratio control of a continuously variable transmission of claim 1, wherein the ratio limits and override ring executable functions selects a ratio achieving conditions of the commanded ratio given vehicle operating conditions.

11. An apparatus for ratio control of a continuously variable transmission, comprising:
    a driver commanded ratio unit outputting a signal defining a commanded ratio;
    a ratio selection and ratio control clamp control portion in communication with the driver commanded ratio unit, the ratio selection and ratio control clamp control portion including:
        a ratio limits and override ring selecting a ratio matching the commanded ratio from a ratio limits and override ring executable functions having stored ratio code data;
        a ratio control execution ring in communication with the ratio limits and override ring, the ratio control execution ring calculating a range of pressures allowed for operation of both a primary pulley and a secondary pulley of the continuously variable transmission, the ratio control execution ring including:
            a ratio control execution ring executable functions having stored data related to multiple different commanded ratios; and
            a ratio control execution ring screening monitor continuously receiving pressure signal data from the ratio control execution ring executable functions and measuring commanded primary and secondary pulley pressures, the ratio control execution ring screening monitor applying vehicle acceleration data to identify if commanded pressure is leading or lagging a sudden change in vehicle acceleration.

12. The apparatus for ratio control of a continuously variable transmission of claim 11, further including a ratio limits and override ring screening monitor continuously receiving output from the ratio limits and override ring executable functions.

13. The apparatus for ratio control of a continuously variable transmission of claim 12, further including a vehicle speed signal, the ratio limits and override ring screening monitor using the vehicle speed signal to compute minimum and maximum ratio limits for the ratio selected by the ratio limits and override ring.

14. The apparatus for ratio control of a continuously variable transmission of claim 11, wherein the ratio selection and ratio control clamp control portion further includes a CVT commanded ratio trajectory ring, the commanded ratio trajectory ring generating a CVT commanded ratio meeting the minimum and maximum ratio limits.

15. The apparatus for ratio control of a continuously variable transmission of claim 14, wherein the ratio selection and ratio control clamp control portion further includes a clamping pressure determination ring identifying a minimum pressure or force required for operation of either the primary pulley or the secondary pulley.

16. The apparatus for ratio control of a continuously variable transmission of claim 15, wherein each of the CVT commanded ratio and the minimum pressure is independently communicated to the ratio control execution ring.

17. The apparatus for ratio control of a continuously variable transmission of claim 11, further including:
 a transmission solenoid control ring, the ratio control execution ring screening monitor forwarding a clamping signal to the transmission solenoid control ring to establish commanded pressures to the primary pulley and the secondary pulley; and
 a clutch control module in communication with the transmission solenoid control ring.

18. An apparatus for ratio control of a continuously variable transmission, comprising:
 a driver commanded ratio unit outputting a signal defining a commanded ratio;
 a ratio selection and ratio control clamp control portion in communication with the driver commanded ratio unit, the ratio selection and ratio control clamp control portion including:
  a ratio limits and override ring selecting a ratio matching the commanded ratio from a ratio limits and override ring executable functions having stored ratio code data;
  a ratio limits and override ring screening monitor continuously receiving output from the ratio limits and override ring executable functions and using an input from a vehicle speed signal to compute minimum and maximum ratio limits for the ratio selected by the ratio limits and override ring;
  a ratio control execution ring in communication with the ratio limits and override ring screening monitor, the ratio control execution ring calculating a range of pressures allowed for operation of both primary and secondary pulleys of the continuously variable transmission, the ratio control execution ring including:
   a ratio control execution ring executable functions having a range of pressures to achieve the commanded ratio from stored data related to multiple different commanded ratios; and
   an ratio control execution ring screening monitor continuously receiving pressure signal data from the ratio control execution ring executable functions and measuring commanded primary and secondary pulley pressures, the ratio control execution ring screening monitor applying vehicle acceleration data received to identify if commanded pressure is leading or lagging a sudden change in vehicle deceleration.

19. The apparatus for ratio control of a continuously variable transmission of claim 18, further including a clutch control monitoring ring provided external to the ratio selection and ratio control clamp control portion, the clutch control monitoring ring continuously monitoring an accelerator pedal, a brake pedal, and pressures of the primary pulley and the secondary pulley pressures.

20. The apparatus for ratio control of a continuously variable transmission of claim 19, wherein the clutch control monitoring ring is in communication with an acceleration-deceleration module, the clutch control monitoring ring generating an open-input-clutch signal to open a vehicle input clutch.

* * * * *